(12) United States Patent
Kawabe

(10) Patent No.: US 9,046,708 B2
(45) Date of Patent: *Jun. 2, 2015

(54) DISPLAY DEVICE

(71) Applicants: Japan Display Inc., Tokyo (JP);
Panasonic Liquid Crystal Display Co., Ltd., Hyogo-ken (JP)

(72) Inventor: Shinichi Kawabe, Yokohama (JP)

(73) Assignees: Japan Display Inc., Tokyo (JP);
Panasonic Liquid Crystal Display Co., Ltd., Hyogo-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/167,453

(22) Filed: Jan. 29, 2014

(65) Prior Publication Data

US 2014/0146250 A1 May 29, 2014

Related U.S. Application Data

(63) Continuation of application No. 12/821,298, filed on Jun. 23, 2010, now Pat. No. 8,648,818.

(30) Foreign Application Priority Data

Jun. 26, 2009 (JP) ................................. 2009-152044
Mar. 10, 2010 (JP) ................................. 2010-052447

(51) Int. Cl.
*G02F 1/1333* (2006.01)
*G02F 1/1335* (2006.01)

(52) U.S. Cl.
CPC ...... *G02F 1/13338* (2013.01); *G02F 1/133502*
(2013.01); *G02F 2201/38* (2013.01); *G02F 2202/02* (2013.01)

(58) Field of Classification Search
None
See application file for complete search history.

(56) References Cited

U.S. PATENT DOCUMENTS

| 2007/0002211 | A1 | 1/2007 | Sasaki et al. |
| 2007/0046874 | A1 | 3/2007 | Adachi et al. |
| 2010/0015983 | A1 | 1/2010 | Anigstein |
| 2010/0053499 | A1* | 3/2010 | Sasaki ............................. 349/62 |

FOREIGN PATENT DOCUMENTS

| JP | 05-011239 | 1/1993 |
| JP | 07-209635 | 8/1995 |
| JP | 07-290647 | 11/1995 |
| JP | 2001-031451 | 2/2001 |
| JP | 2005-089195 | 4/2005 |
| JP | 2005-187237 | 7/2005 |
| JP | 2007-041534 | 2/2007 |
| JP | 2007-047621 | 2/2007 |
| JP | 2008-241728 | 10/2008 |
| WO | WO 2008/149789 | 12/2008 |

* cited by examiner

*Primary Examiner* — David D Davis
(74) *Attorney, Agent, or Firm* — Lowe Hauptman & Ham, LLP

(57) ABSTRACT

A display device includes a display panel, a protective plate which is provided opposed to the display panel, a member having touch sensor function, and a transparent organic layer which is provided between the display panel and the protective plate. The transparent organic layer includes an outer organic layer which is shaped like a frame to enclose at least a portion of an effective display area of the display panel, and an inner organic layer which is formed from the same material as the frame to fill a space enclosed by the frame. At least a part of the outer organic layer overlaps the effective display area of the display panel; and at least one of the display panel and the protective plate forms a portion of the member having touch sensor function.

5 Claims, 9 Drawing Sheets

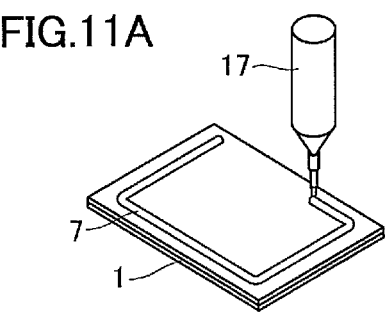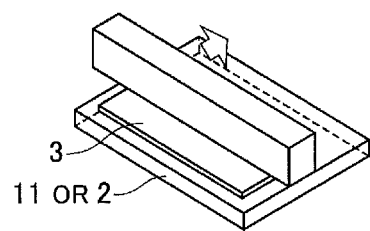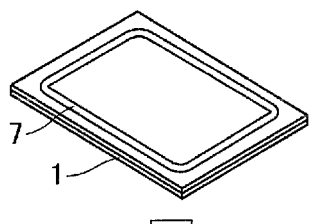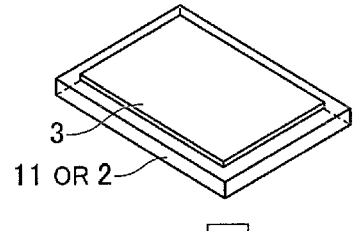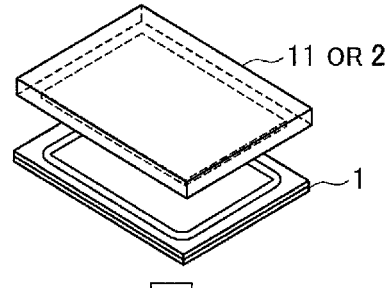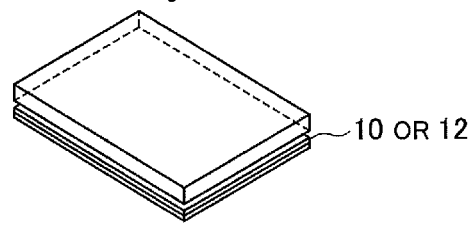

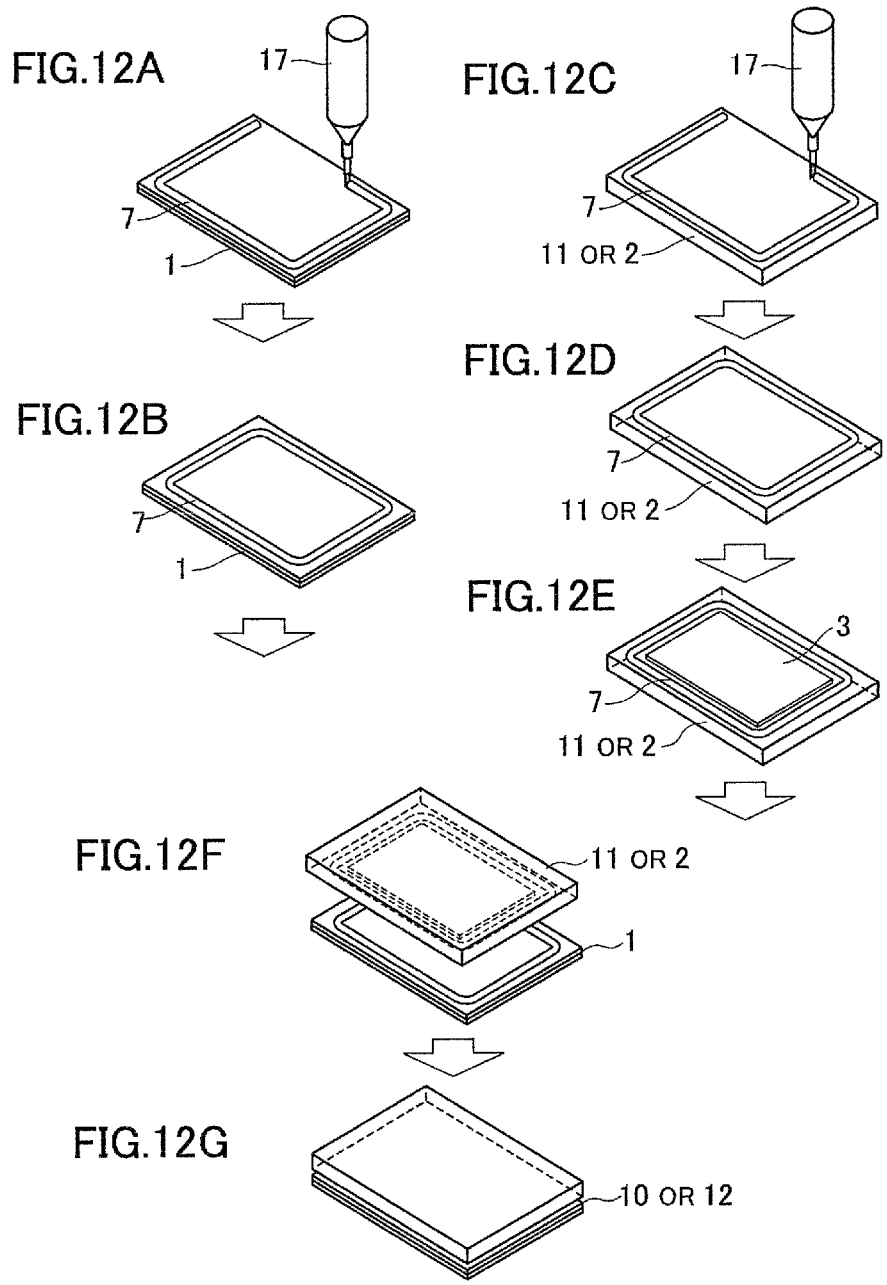

DISPLAY DEVICE

CROSS-REFERENCE TO RELATED APPLICATION

This application is a continuation application of U.S. application Ser. No. 12/821,298, filed Jun. 23, 2010, now U.S. Pat. No. 8,648,818, the contents of which are incorporated herein by reference.

The present application claims priority from Japanese applications JP 2009-152044 filed on Jun. 26, 2009 and JP 2010-052447 filed on Mar. 10, 2010, the contents of which are hereby incorporated by reference into this application.

BACKGROUND OF THE INVENTION

1. Field of the Invention

The present invention relates to a product structure of a display device that includes one or both of a transparent protective plate and a transparent substrate having a touch panel function which are disposed on a viewing side of a display panel.

2. Description of the Related Art

Many of display devices for home-use televisions and personal computers and information display devices installed in public facilities are liquid crystal display devices or organic electroluminescence display devices. Liquid crystal display devices are employed in a particularly wide range of products from as small ones as 2-inch monitors for cellular phones and the like to 60-inch or larger television monitors.

Most liquid crystal display devices include a thin film transistor (TFT) substrate and a color filter (CF) substrate which are 0.2 to 0.7 mm-thick, between which liquid crystal is held. Some cellular phones, digital cameras, small-sized information terminals, and other devices where a liquid crystal panel surface is frequently touched during use therefore have a transparent protective plate in front of a liquid crystal panel to prevent external mechanical forces from disturbing displayed data or breaking the liquid crystal panel.

In personal computer monitors, home-use televisions, and other similar appliances, too, where the liquid crystal panel surface is touched less frequently, the liquid crystal panel itself could be shattered if something like tableware or a toy hits the liquid crystal panel surface with a large enough force. Therefore, similarly to cellular phones, digital cameras, small-sized information terminals, and the like, some of such products as personal computer monitors and home-use televisions have a transparent protective plate 2 in front of a liquid crystal panel 1 as illustrated in FIG. 3 in order to prevent damage to the liquid crystal panel.

However, disposing the transparent protective plate 2 in front of the liquid crystal display panel 1 causes reflection of light at an interface between materials having different optical characteristics, specifically, refractive indices. In the case of a structure illustrated in FIG. 3, reflection of light is observed at an interface between the protective plate 2 and air existing in front of the protective plate 2, an interface between the protective plate 2 and an air layer 8 located behind the protective plate 2, and an interface between a first polarization plate 4 and the air layer 8. The reflection significantly impairs visibility of a displayed image especially in a bright environment.

In recent years, devices that have a touch panel functioning as an input device on the front side (viewing side) of the display panel are rapidly gaining popularity, because those devices may be operated easily and intuitively by touching a switch or other icons displayed on the display panel to be manipulated.

Touch panels are classified by operating principle into the following types.

[Resistive Type]

As illustrated in FIG. 4, a resistive touch panel has a structure in which transparent conductive films 21 (indium tin oxide: ITO) are formed on opposing surfaces of an upper polyethylene terephthalate (PET) film 23 and an underlying glass substrate 20, and the PET film 23 and the glass substrate 20 are then bonded together with spacers 24 interposed therebetween. As illustrated in FIG. 5, touch panel input is registered by depressing the PET film 23 with a finger 14, a pen, or the like and thus bringing the transparent conductive films 21 which are formed on the PET film 23 and the glass substrate 20, respectively, into contact with each other. The spacers 24, which are insulators disposed between the transparent conductive films 21 formed on the PET film 23 and the glass substrate 20, respectively, prevent a short circuit between the upper and lower transparent conductive films 21 when no input is made.

Resistive touch panels are generally classified into "matrix resistive type" and "analog resistive type." In a matrix resistive touch panel, the transparent conductive film 21 on the PET film 23 and the transparent conductive film 21 on the glass substrate 20 are shaped like slips and arranged to be orthogonal to each other, and a touched point is detected from an X coordinate and a Y coordinate where the slip-shaped transparent conductive films 21 are brought into contact with each other. In an analog resistive touch panel, the transparent conductive films 21 are formed all over the opposing surfaces of the PET film 23 and the glass substrate 20, one of the transparent conductive films 21 constitutes an X coordinate circuit whereas the other constitutes a Y coordinate circuit to detect a resistance ratio at a touched point in an analog fashion, and the touched point is determined from an X coordinate and a Y coordinate where the transparent conductive films 21 are brought into contact with each other.

[Capacitive Type]

In a capacitive touch panel, a weak current runs all over a surface of a transparent substrate having a touch panel function. When a person touches this surface with his/her finger, electricity flows into the person's body, creating a change in amount of electric charge. The change in capacitance between the fingertip and a conductive film is captured and a dedicated touch controller outputs the amount of change as coordinate data.

Other touch panel types include optical type, ultrasonic type, surface acoustic wave type, induction type, and capacitive coupling type.

As is the case for a protective plate, when one of those touch panels is disposed on the front side of a liquid crystal display panel, reflection of light is caused at the interface between materials having different optical characteristics, specifically, refractive indices. In the case of a structure as that of a liquid crystal display device 12 with a touch panel which is illustrated in FIG. 6, reflection of light is observed at the interface between a transparent substrate 11 having a touch panel function and air that is existing in front of the transparent substrate 11 having a touch panel function, the interface between the transparent substrate 11 having a touch panel function and an air layer 8 located behind the transparent substrate 11 having a touch panel function, and the interface between a first polarizing plate 4 and the air layer 8. The reflection significantly impairs the visibility of a displayed image, especially in a bright environment.

In order to prevent the reflection of light due to a difference in refractive index, JP 5-11239 A and JP 2007-41534 A propose a panel structure illustrated in FIG. 7 where the air layer 8 between the protective plate 2 and the polarizing plate 4 is filled with a transparent organic medium (transparent interlayer 3) whose refractive index is equal to or close to that of the protective plate 2 and the polarizing plate 4. With the air layer 8 thus eliminated, external light is reflected less at an interface and the visibility of a displayed image is improved.

The interlayer disposed between the liquid crystal display panel and the protective plate may be made from a liquid material or a solid material. The panel structure proposed in JP 5-11239 A uses a liquid material for the transparent interlayer. JP 2007-47621 A proposes a method of manufacturing this panel structure. JP 2005-89195 A proposes a manufacturing method, though not of a display device, in which two glass substrates sandwich a liquid transparent interlayer whose refractive index is equal to or close to that of the glass material.

In order to give an example of the transparent interlayer that is made from a solid material, JP 2001-31451 A, JP 2005-187237 A, and JP 7-290647 A propose a product (laminated glass, not a display device) structured such that two glass substrates sandwich a solid sheet material whose refractive index is equal to or close to that of the glass material, and a method of manufacturing the product.

JP 7-209635 A describes a method of manufacturing an anti-light scattering structure in a liquid crystal display device in which a protective panel made of synthetic resin is framed by a frame portion, which includes a distortion tolerance area at the circumference thereof, to have a dish shape, a liquid raw material of an anti-light scattering material is injected onto the top surface of the protective panel, or a cured anti-light scattering material is inserted on the top surface of the protective panel, a liquid crystal cell is then disposed from above, and an excess amount of the anti-light scattering material is led to the distortion tolerance area by depressing the liquid crystal cell to deaerate and bond the components together intimately.

In the case of a display device structured to have an interlayer made from a liquid material between a display panel and a protective plate, or a display device structured to have interlayers made from a liquid material between a display panel and a touch panel and between the touch panel and a protective plate, the liquid interlayer material may leak out of the display device during manufacture of a product or while the product is in use. A measure to avoid the leakage needs to be taken by providing a bank for preventing the interlayer in a liquid state from overflowing outside an effective display area of the display panel so that the effective display area is surrounded by the bank.

SUMMARY OF THE INVENTION

The present invention has been made in view of the above, and it is therefore an object of the present invention to provide a product structure of a display device with a protective plate and a product structure of a display device with a touch panel, in which a liquid interlayer material is prevented from leaking out of the display devices during manufacture of a product or while the product is in use.

In order to solve the above-mentioned problems and attain the above-mentioned object, the present invention employs the following measures.

[Measure 1]

A display device including: a display panel; a transparent protective plate, or a transparent substrate having a touch panel function, which is disposed on a front side of the display panel; and a transparent organic medium layer which is provided between the display panel and the protective plate, or between the display panel and the transparent substrate having a touch panel function, or between the protective plate and the transparent substrate having a touch panel function, has a structure in which a transparent organic medium is formed into a frame pattern outside an effective display area of the display panel, or along the effective display area, to surround the effective display area, and the same organic medium that is used to form the frame fills a space surrounded by the frame.

[Measure 2]

In a display device including: a display panel; a transparent protective plate, or a transparent substrate having a touch panel function, which is disposed on a front side of the display panel; and a transparent organic medium layer which is provided between the display panel and the protective plate, or between the display panel and the transparent substrate having a touch panel function, or between the protective plate and the transparent substrate having a touch panel function, a transparent organic medium formed into a frame pattern outside an effective display area of the display panel, or along the effective display area, to surround the effective display area, is cured.

[Measure 3]

A display device including: a display panel; a transparent protective plate, or a transparent substrate having a touch panel function, which is disposed on a front side of the display panel; and a transparent organic medium layer which is provided between the display panel and the protective plate, or between the display panel and the transparent substrate having a touch panel function, or between the protective plate and the transparent substrate having a touch panel function, has a structure in which an organic medium surrounding an effective display area of the display panel is formed on each of the display panel and the transparent protective plate disposed on the front side of the display panel, or on each of the display panel and the transparent substrate having a touch panel function and disposed on the front side of the display panel, or on each of the transparent protective plate and the transparent substrate having a touch panel function, and the same organic medium that is used to form the frame fills a space surrounded by the frame.

[Measure 4]

In a display device including: a display panel; a transparent protective plate, or a transparent substrate having a touch panel function, which is disposed on a front side of the display panel; and a transparent organic medium layer which is provided between the display panel and the protective plate, or between the display panel and the transparent substrate having a touch panel function, or between the protective plate and the transparent substrate having a touch panel function, a transparent organic medium is formed into a frame pattern outside of an effective display area of the display panel, or along the effective display area, to surround the effective display area and, after the organic medium frame is cured, a space surrounded by the organic medium frame is filled with the same liquid organic medium that is used to form the frame and then the display panel and the protective plate are bonded together, or the display panel and the transparent substrate having a touch panel function are bonded together, or the protective plate and the transparent substrate having a touch panel function are bonded together.

[Measure 5]

In a display device including: a display panel; a transparent protective plate, or a transparent substrate having a touch panel function, which is disposed on a front side of the display panel; and a transparent organic medium layer which is provided between the display panel and the protective plate, or between the display panel and the transparent substrate having a touch panel function, or between the protective plate and the transparent substrate having a touch panel function, a transparent organic medium is formed into a frame pattern outside of an effective display area of the display panel, or along the effective display area, to surround the effective display area and, after the organic medium frame is cured, a space surrounded by the organic medium frame which is cured is filled with the same liquid organic medium that is used to form the frame and then the display panel and the protective plate are bonded together, or the display panel and the transparent substrate having a touch panel function are bonded together, or the protective plate and the transparent substrate having a touch panel function are bonded together. After that, the organic medium is cured.

By using the same material for the transparent interlayer and for the frame-shaped transparent interlayer, and surrounding the transparent interlayer with the frame-shaped transparent interlayer which is cured in advance, the transparent interlayer is prevented from leaking and, in addition, the display area may be extended to include the frame-shaped transparent interlayer. A non-display area in the circumference of the display panel may thus be reduced in width.

Another effect is that material management in manufacturing a panel module is simplified because the transparent bank for preventing the interlayer from overflowing is formed from the same liquid material as the transparent interlayer that fills the space surrounded by the bank.

Moreover, because the frame-shaped transparent interlayer has a function to define a gap between the display panel and the protective plate, or a gap between the display panel and the transparent substrate having a touch panel function, or a gap between the transparent substrate having a touch panel function and the protective plate, in bonding the display panel and the protective plate, or the display panel and the transparent substrate having a touch panel function, or the transparent substrate having a touch panel function and the protective plate, a bonding apparatus does not need to have an accurate gap control mechanism/function for regulating the gap between the display panel and the protective plate, or the gap between the display panel and the transparent substrate having a touch panel function, or the gap between the transparent substrate having a touch panel function and the protective plate.

BRIEF DESCRIPTION OF THE DRAWINGS

In the accompanying drawings:

FIGS. 11A to 11F are perspective views illustrating a method of manufacturing the liquid crystal display device according to the first embodiment of the present invention;

FIGS. 12A to 12G are perspective views illustrating a method of manufacturing the liquid crystal display device according to the second embodiment of the present invention;

DETAILED DESCRIPTION OF THE INVENTION

First Embodiment

Liquid crystal display devices according to a first embodiment of the present invention are described with reference to FIGS. 1, 2, and 11A to 11F.

Figure 2:
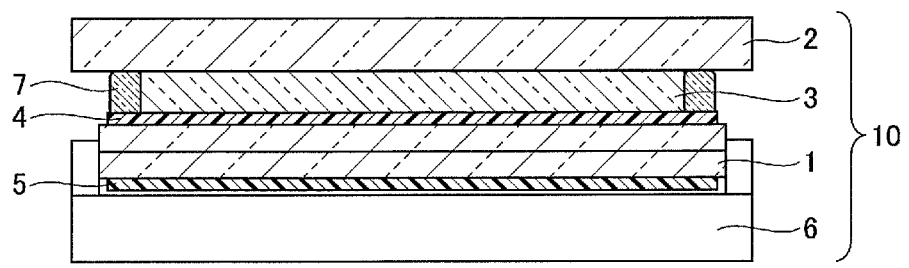
FIG. 2 is a sectional view of another liquid crystal display device according to the first embodiment of the present invention.
Figure 3:
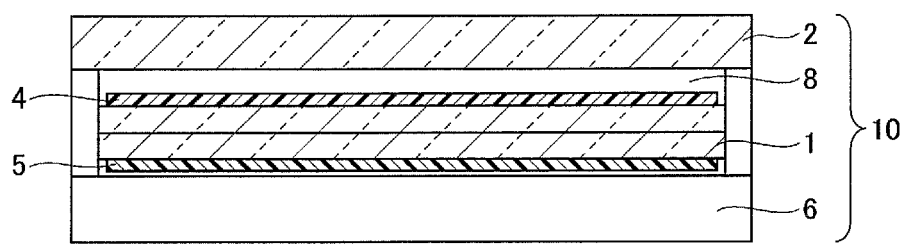
FIG. 3 is a sectional view of a conventional liquid crystal display device to which a protective plate is attached.
Figure 4:
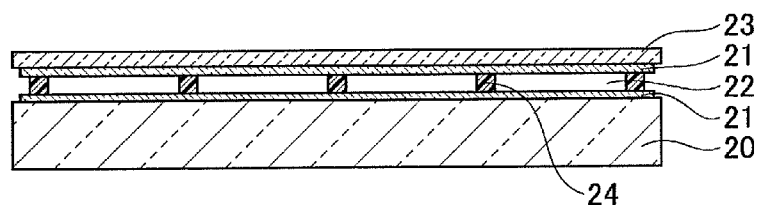
FIG. 4 is a sectional view of a resistive touch panel.
Figure 5:
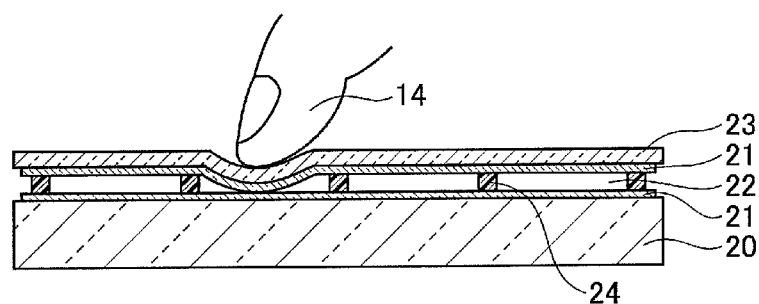
FIG. 5 is a sectional view of a resistive touch panel being operated with a finger.
Figure 6:
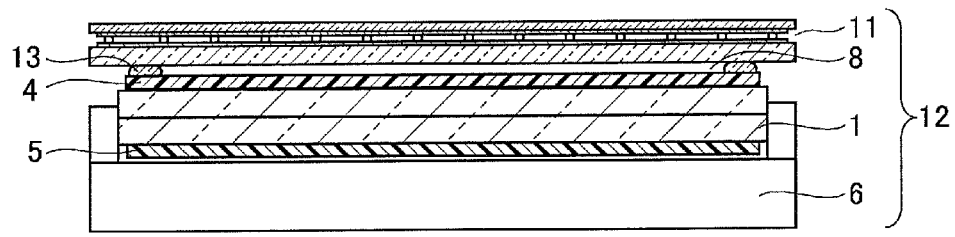
FIG. 6 is a sectional view of a conventional liquid crystal display device to which a touch panel is attached.
Figure 7:
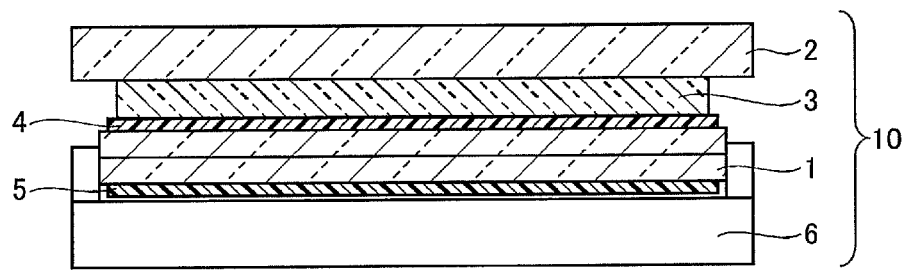
FIG. 7 is a sectional view of a liquid crystal display device in which a transparent interlayer fills a space between the liquid crystal display device and a protective plate.

FIG. 2 is a sectional view of the liquid crystal display device with a protective plate according to this embodiment. A liquid crystal display device 10 with a protective plate according to this embodiment includes a liquid crystal display panel 1, a backlight unit 6, a protective plate 2, a transparent interlayer 3, and a frame-shaped transparent interlayer 7.

This embodiment uses a liquid organic medium for the transparent interlayer 3 and the frame-shaped transparent interlayer 7.

Figure 1:
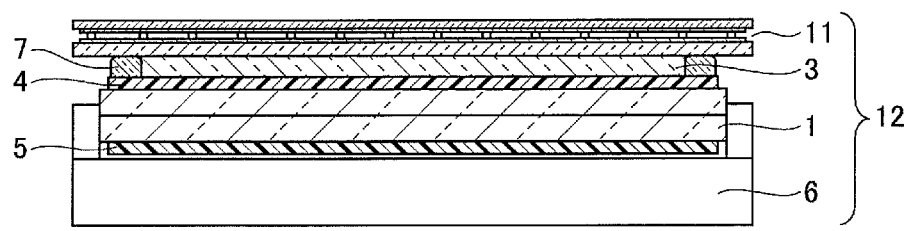
FIG. 1 is a sectional view of a liquid crystal display device according to a first embodiment of the present invention.

FIG. 1 is a sectional view of a liquid crystal display device 12 with a touch panel in which a resistive touch panel, instead of the protective plate 2, is disposed on a front side of the display panel. The liquid crystal display device 12 with a touch panel according to this embodiment includes the liquid crystal display panel 1, the backlight unit 6, a transparent substrate 11 having a touch panel function, the transparent interlayer 3, and the frame-shaped transparent interlayer 7.

This embodiment uses a liquid organic medium for the transparent interlayer 3 and the frame-shaped transparent interlayer 7.

FIGS. 11A to 11F illustrate an example of a method of manufacturing the liquid crystal display device 10 with a protective plate or the liquid crystal display device 12 with a touch panel according to this embodiment by using a liquid organic medium. The liquid organic medium is applied in a frame pattern to the liquid crystal display panel 1, or to one of the protective plate 2 and the transparent substrate 11 having a touch panel function, by a dispenser or by printing such as screen printing (FIG. 11A) (in the example of FIGS. 11A to 11F, a dispenser 17 is used to form the frame). The liquid organic medium applied in the frame pattern is then cured (the frame-shaped transparent interlayer 7) (FIG. 11B). A curing method for the liquid organic medium is determined by what liquid organic medium is used. The employed curing method may be ultra-violet light irradiation or heating, or a combination of ultra-violet light irradiation and heating.

The other substrate has the transparent interlayer 3 in an area that falls inside the frame-shaped transparent interlayer 7 when the liquid crystal display panel 1 is bonded to the protective plate 2 or to the transparent substrate 11 having a touch panel function. The transparent interlayer 3 is formed from the same liquid organic medium as the frame-shaped transparent interlayer 7 through application by a dispenser or by printing such as screen printing (FIG. 11C) (FIG. 11D). The liquid crystal display panel 1 is then bonded to the protective plate 2 or to the transparent substrate 11 having a touch panel function (FIG. 11E). If air bubbles are formed within the transparent interlayer 3 which is provided between the liquid crystal display panel 1 and the protective plate 2, or between the liquid crystal display panel 1 and the transparent substrate 11 having a touch panel function, during the bonding, the quality of the display panel is lowered. It is therefore desirable to perform the bonding in a reduced-pressure atmosphere where the chance of air bubbles forming is small.

By thus using the same material for the transparent interlayer 3 and for the frame-shaped transparent interlayer 7 and surrounding the transparent interlayer 3 with the frame-shaped transparent interlayer 7 which is cured in advance, the transparent interlayer 3 is prevented from leaking and, in addition, an effective display area may be extended to include the frame-shaped transparent interlayer 7.

Moreover, because the frame-shaped transparent interlayer 7 has a function to define a gap between the liquid crystal display panel 1 and the protective plate 2, or a gap between the liquid crystal display panel 1 and the transparent substrate 11 having a touch panel function, in bonding the liquid crystal display panel 1 to the protective plate 2 or to the transparent substrate 11 having a touch panel function, a bonding apparatus does not need to have an accurate gap control mechanism/function for regulating the gap between the liquid crystal display panel 1 and the protective plate 2, or the gap between the liquid crystal display panel 1 and the transparent substrate 11 having a touch panel function.

The same effects are obtained also in a liquid crystal display device where the transparent interlayer 3 is cured after the bonding by a measure suitable to the characteristics of the material used as described above (ultra-violet light irradiation or heating, or a combination of ultra-violet light irradiation and heating).

Second Embodiment

Liquid crystal display devices according to a second embodiment of the present invention are described with reference to FIGS. 8, 9, and 12A to 12G.

In the liquid crystal display device 10 with a protective plate and the liquid crystal display device 12 with a touch panel that are described in the first embodiment, the frame-shaped transparent interlayer 7 is formed by application on one of the two substrates. The same effects as in the first embodiment are obtained also when the frame-shaped transparent interlayer 7 is formed on each of the display panel 1 and the protective plate 2, or the display panel 1 and the transparent substrate 11 having a touch panel function, that are bonded together as illustrated in FIGS. 8 and 9.

Figure 8:
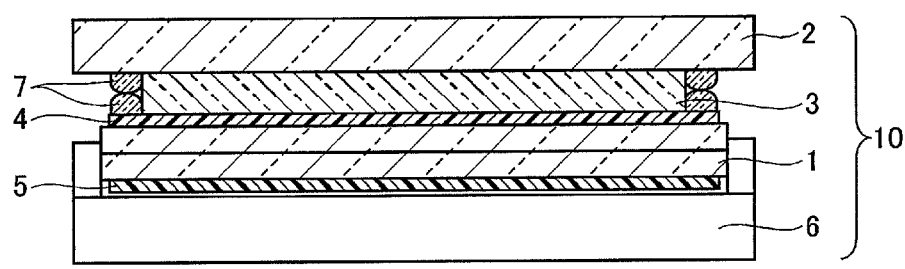
FIG. 8 is a sectional view of a liquid crystal display device according to a second embodiment of the present invention.
Figure 9:
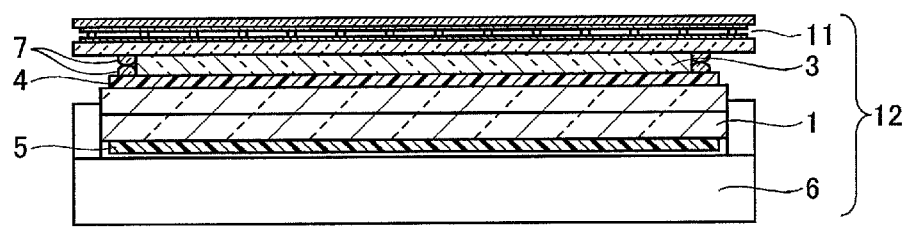
FIG. 9 is a sectional view of another liquid crystal display device according to the second embodiment of the present invention.

FIG. 8 is a sectional view of a liquid crystal display device 10 with a protective plate according to the second embodiment, and FIG. 9 is a sectional view of a liquid crystal display device 12 with a touch panel according to the second embodiment.

The liquid crystal display device 10 with a protective plate according to this embodiment includes a (liquid crystal) display panel 1, a backlight unit 6, a protective plate 2, a transparent interlayer 3, and frame-shaped transparent interlayers 7. The liquid crystal display device 12 with a touch panel according to this embodiment includes the (liquid crystal) display panel 1, the backlight unit 6, a transparent substrate 11 with a touch panel function, the transparent interlayer 3, and the frame-shaped transparent interlayers 7.

This embodiment uses a liquid organic medium for the transparent interlayer 3 and the frame-shaped transparent interlayers 7.

FIGS. 12A to 12G illustrate an example of a method of manufacturing the liquid crystal display devices according to this embodiment with the use of a liquid organic medium. The liquid crystal display device 10 with a protective plate and the liquid crystal display device 12 with a touch panel are both manufactured by the same method. Therefore, in the manufacturing method described below, the protective plate 2 is picked up as a component that is disposed on the front side of the display panel 1 with the transparent interlayer 3 and the frame-shaped transparent interlayers 7 interposed therebetween. The manufacturing method described below may be applied to the liquid crystal display device 12 with a touch panel by replacing the protective plate 2 in the description with the transparent substrate 11 having a touch panel function.

A liquid organic medium is applied in a frame pattern to the liquid crystal display panel 1 and the protective plate 2 both by a dispenser or by printing such as screen printing (FIG. 12A, FIG. 12C). The frame on the liquid crystal display panel 1 and the frame on the protective plate 2 have the same shape. The frame pattern is applied in a position that makes the frame-shaped transparent interlayer 7 formed on the liquid crystal display panel 1 and the frame-shaped transparent interlayer 7 formed on the protective plate 2 coincide with each other when the liquid crystal display panel 1 and the protective plate 2 are bonded together. The liquid organic medium applied in a frame pattern is then cured (FIG. 12B, FIG. 12D). The transparent interlayer 3 is subsequently formed on one or both of the liquid crystal display panel 1 and the protective plate 2 in an area that falls inside the frame-shaped transparent interlayer 7. The transparent interlayer 3 is formed from the same liquid organic medium as the frame-shaped transparent interlayers 7 through application by a dispenser or by printing such as screen printing (FIG. 12E). After that, the liquid crystal display panel 1 and the protective plate 2 are bonded together (FIG. 12F, FIG. 12G) by the same bonding method as in the first embodiment.

Deterioration in the application accuracy of the dispenser or the printer may cause a slight difference in shape between the frame-shaped transparent interlayers 7 formed on the liquid crystal display panel 1 and on the protective plate 2, and a lowered accuracy in bonding the liquid crystal display panel 1 and the protective plate 2 together may cause the frame-shaped transparent interlayers 7 formed on the liquid crystal display panel 1 and on the protective plate 2 to be offset from each other. Even then, substantially the same effects are obtained.

Third Embodiment

A liquid crystal display device according to a third embodiment of the present invention is described with reference to FIGS. 10, 13A to 13H, and 14A to 14H.

Figure 10:
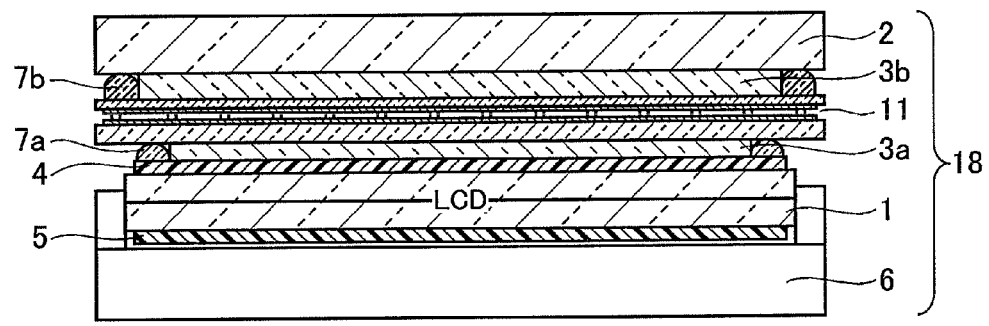
FIG. 10 is a sectional view of a liquid crystal display device according to a third embodiment of the present invention.

FIG. 10 is a sectional view of a liquid crystal display device 18 with a touch panel and a protective plate according to this embodiment. The liquid crystal display device 18 with a touch panel and a protective plate includes the liquid crystal display panel 1, the backlight unit 6, the transparent substrate 11 having a touch panel function, the protective plate 2, transparent interlayers 3a and 3b, and frame-shaped transparent interlayers 7a and 7b. The liquid crystal display panel 1 is an IPS type display panel.

In the liquid crystal display device 18 with a touch panel and a protective plate, as illustrated in FIG. 10, the transparent substrate 11 having a touch panel function is disposed on the front side (viewing side) of the display panel 1 with the transparent interlayer 3a and the frame-shaped transparent interlayer 7a interposed therebetween, and the protective plate 2 is disposed on the front side of the transparent substrate 11 having a touch panel function with the transparent interlayer 3b and the frame-shaped transparent interlayer 7b interposed therebetween.

FIGS. 13A to 13H illustrate an example of a method of manufacturing the liquid crystal display device 18 with a touch panel and a protective plate according to this embodiment. First, a liquid organic medium is applied in a frame pattern to one of the liquid crystal display panel 1 and the transparent substrate 11 having a touch panel function by a dispenser or by printing such as screen printing (FIG. 13A) (in the example of FIGS. 13A to 13H, the dispenser 17 is used to form the frame). The liquid organic medium applied in the frame pattern is then cured (the frame-shaped transparent interlayer 7a). A curing method for the liquid organic medium is determined by what liquid organic medium is used. The employed curing method may be ultra-violet light irradiation or heating, or a combination of ultra-violet light irradiation and heating.

Figure 13A:
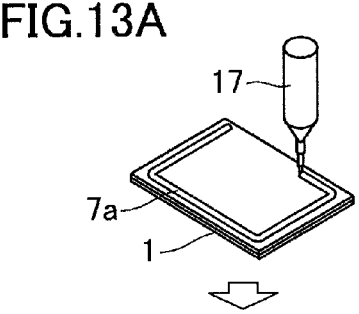
FIGS. 13A to 13H are perspective views illustrating a method of manufacturing the liquid crystal display device according to the third embodiment of the present invention.
Figure 13B:
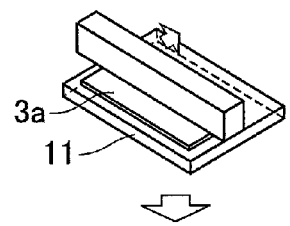
Figure 13C:
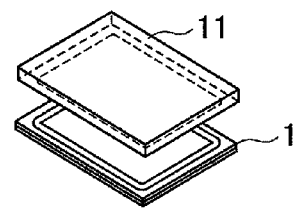
Figure 13D:
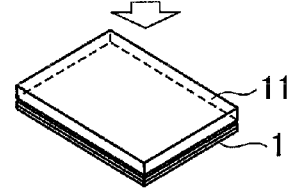

The other substrate has the transparent interlayer 3a in an area that falls inside the frame-shaped transparent interlayer 7a when the liquid crystal display panel 1 is bonded to the transparent substrate 11 having a touch panel function. The transparent interlayer 3a is formed from the same liquid organic medium as the frame-shaped transparent interlayer 7a through application by a dispenser or by printing such as screen printing (FIG. 13B). The liquid crystal display panel 1 and the transparent substrate 11 having a touch panel function are then bonded together (FIG. 13C) (FIG. 13D). If air bubbles are formed within the transparent interlayer 3a between the liquid crystal display panel 1 and the transparent substrate 11 having a touch panel function during the bonding, the quality of the liquid crystal display panel is lowered. It is therefore desirable to perform the bonding in a reduced-pressure atmosphere where the chance of air bubbles forming is small.

Figure 13E:
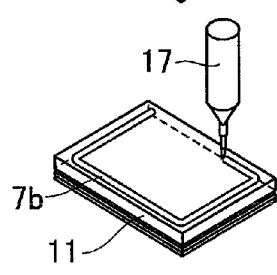

Next, a liquid organic medium is applied in a frame pattern by a dispenser or by printing such as screen printing to the viewing side of the transparent substrate 11 having a touch panel function which has been bonded to the display panel 1 via the transparent interlayer 3a and the frame-shaped transparent interlayer 7a, or to the protective plate 2 (FIG. 13E). The liquid organic medium applied in the frame pattern is then cured (the frame-shaped transparent interlayer 7b). A curing method for the liquid organic medium is determined by what liquid organic medium is used. The employed curing method may be ultra-violet light irradiation or heating, or a combination of ultra-violet light irradiation and heating.

Figure 13F:
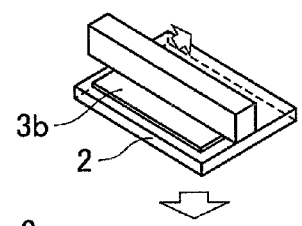
Figure 13G:
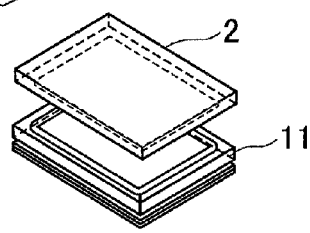
Figure 13H:
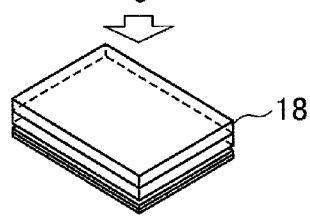
Figure 14A:
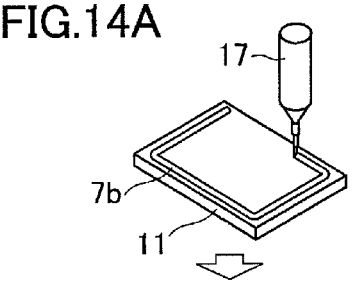
FIGS. 14A to 14H are perspective views illustrating another method of manufacturing the liquid crystal display device according to the third embodiment of the present invention.
Figure 14B:
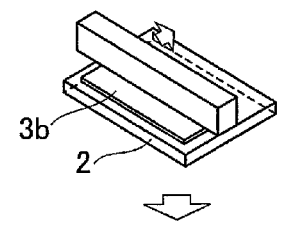
Figure 14C:
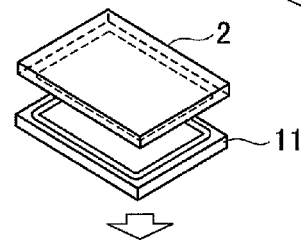
Figure 14D:
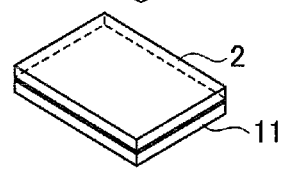
Figure 14E:
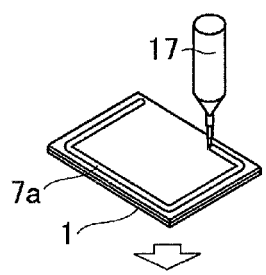
Figure 14F:
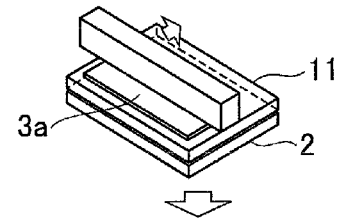
Figure 14G:
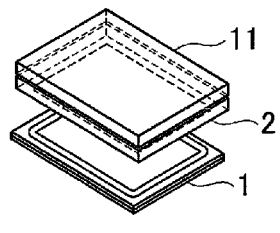
Figure 14H:
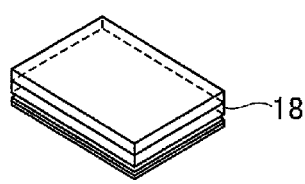

The other substrate has the transparent interlayer 3b in an area that falls inside the frame-shaped transparent interlayer 7b when the transparent substrate 11 having a touch panel function and the protective plate 2 are bonded together. The transparent interlayer 3b is formed from the same liquid organic medium as the frame-shaped transparent interlayer 7b through application by a dispenser or by printing such as screen printing (FIG. 13F). The transparent substrate 11 having a touch panel function and the protective plate 2 are then bonded together (FIG. 13G). If air bubbles are formed within the transparent interlayer 3b between the transparent substrate 11 having a touch panel function and the protective plate 2 during the bonding, the quality of the liquid crystal display panel is lowered. It is therefore desirable to perform the bonding in a reduced-pressure atmosphere where the chance of air bubbles forming is small.

By thus using the same material for the transparent interlayer 3a and for the frame-shaped transparent interlayer 7a and using the same material for the transparent interlayer 3b and for the frame-shaped transparent interlayer 7b, or using the same material for all of the transparent interlayers 3a and 3b and the frame-shaped transparent interlayers 7a and 7b, and surrounding the transparent interlayers 3a and 3b with the frame-shaped transparent interlayers 7a and 7b which are cured in advance, the transparent interlayers 3a and 3b are prevented from leaking and, in addition, an effective display area may be extended to include the frame-shaped transparent interlayers 7a and 7b.

Moreover, the frame-shaped transparent interlayers 7a and 7b define the gap between the liquid crystal display panel 1 and the transparent substrate 11 having a touch panel function and the gap between the transparent substrate 11 having a touch panel function and the protective plate 2 in bonding the liquid crystal display panel 1 to the transparent substrate 11 having a touch panel function and bonding the transparent substrate 11 having a touch panel function to the protective plate 2. A bonding apparatus therefore does not need to have an accurate gap control mechanism/function for regulating the gap between the liquid crystal display panel 1 and the transparent substrate 11 having a touch panel function and the gap between the transparent substrate 11 having a touch panel function and the protective plate 2.

The same effects are obtained also in a liquid crystal display device where the transparent interlayers 3a and 3b are cured after the bonding by a measure suitable to the characteristics of the material used as described above (ultra-violet light irradiation or heating, or a combination of ultra-violet light irradiation and heating).

The liquid crystal display device 18 with a touch panel and a protective plate of FIG. 10 may be manufactured also by a method illustrated in FIGS. 14A to 14H. In FIGS. 14A to 14H, the transparent substrate 11 having a touch panel function and the protective plate 2 are bonded first with the transparent interlayer 3b and the frame-shaped transparent interlayer 7b interposed therebetween. The transparent substrate 11 having a touch panel function and the protective plate 2 which have been assembled together into one component are then bonded to the display panel 1 with the transparent interlayer 3a and the frame-shaped transparent interlayer 7a interposed therebetween.

Fourth Embodiment

A liquid crystal display device according to a fourth embodiment of the present invention is described with reference to FIG. 15.

Figure 15:
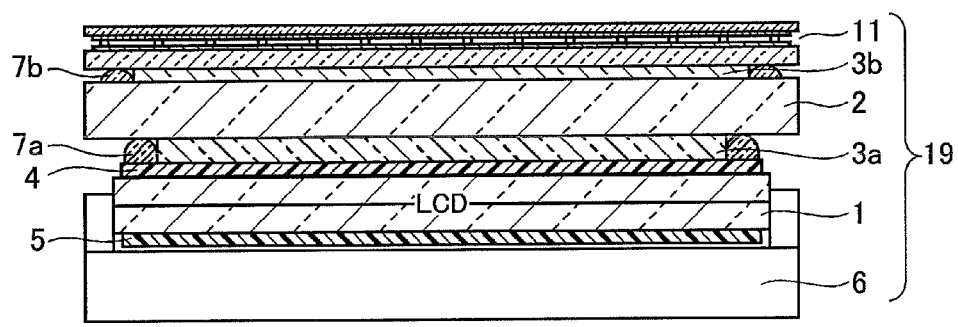
FIG. 15 is a sectional view of a liquid crystal display device according to a fourth embodiment of the present invention.

FIG. 15 is a sectional view of a liquid crystal display device 19 with a touch panel and a protective plate according to this embodiment. The liquid crystal display device 19 with a touch panel and a protective plate includes the liquid crystal display panel 1, the backlight unit 6, the protective plate 2, the transparent substrate 11 having a touch panel function, the transparent interlayers 3a and 3b, and the frame-shaped transparent interlayers 7a and 7b.

In the liquid crystal display device 19 with a touch panel and a protective plate, as illustrated in FIG. 15, the protective plate 2 is disposed on the front side (viewing side) of the display panel 1 with the transparent interlayer 3a and the frame-shaped transparent interlayer 7a interposed therebetween, and the transparent substrate 11 having a touch panel function is disposed on the front side of the protective plate 2 with the transparent interlayer 3b and the frame-shaped transparent interlayer 7b interposed therebetween.

The liquid crystal display device 19 with a touch panel and a protective plate of this embodiment is manufactured by the same method as the manufacturing method of the liquid crystal display device 18 with a touch panel and a protective plate described above, except that the order of bonding the transparent substrate 11 having a touch panel function and the protective plate 2 is reversed. A description on the manufacturing method of the liquid crystal display device 19 with a touch panel and a protective plate is therefore omitted here.

While the embodiments discussed above take a liquid crystal display panel as an example, the exact same effects are obtained when an organic electroluminescence (EL) panel or the like is used in place of the liquid crystal display panel.

A concrete description has now been given on embodiments of the present invention. However, a display device according to an embodiment of the present invention may be any display device that includes a display panel, a touch panel and/or protective plate disposed on the front side of the display panel, and a transparent organic medium layer provided between the display panel and the touch panel and/or the protective plate, as long as the organic medium layer is formed from a transparent organic medium and shaped like a frame that surrounds an effective display area of the display panel, and the same transparent organic medium as the transparent organic medium shaped like a frame fills a space surrounded by the frame of the transparent organic medium shaped like a frame.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device, comprising:
a display panel;
a protective plate which is provided opposed to the display panel;
a member having a touch sensor function; and
a transparent organic layer which is provided between the display panel and the protective plate;
wherein the transparent organic layer comprises:
an outer organic layer which is shaped like a frame to enclose at least a portion of an effective display area of the display panel; and
an inner organic layer which is formed from the same material as the frame to fill a space enclosed by the frame;
wherein at least a part of the outer organic layer overlaps the effective display area of the display panel; and
wherein at least one of the display panel and the protective plate forms a portion of the member having the touch sensor function.

2. The display device according to claim 1,
wherein the member having the touch sensor function is a capacitive type touch sensor; and
wherein the touch sensor function includes a first touch sensor function, and a second touch sensor function.

3. The display device according to claim 2,
wherein the display panel provides the first touch sensor function; and
wherein the protective plate provides the second touch sensor function.

4. The display device according to claim 2, wherein the display panel provides the first and the second touch sensor function.

5. The display device according to claim 2, wherein the protective plate provides the first and the second touch sensor function.

* * * * *